(12) United States Patent
Takeda

(10) Patent No.: US 9,067,834 B2
(45) Date of Patent: Jun. 30, 2015

(54) METHOD OF MANUFACTURING A CARBON MATERIAL AND THE CARBON MATERIAL

(75) Inventor: Akiyoshi Takeda, Kanonji (JP)

(73) Assignee: TOYO TANSO CO., LTD., Osaka-shi (JP)

( * ) Notice: Subject to any disclaimer, the term of this patent is extended or adjusted under 35 U.S.C. 154(b) by 114 days.

(21) Appl. No.: 13/133,344

(22) PCT Filed: Dec. 2, 2009

(86) PCT No.: PCT/JP2009/070226
§ 371 (c)(1),
(2), (4) Date: Jun. 7, 2011

(87) PCT Pub. No.: WO2010/067734
PCT Pub. Date: Jun. 17, 2010

(65) Prior Publication Data
US 2011/0244267 A1    Oct. 6, 2011

(30) Foreign Application Priority Data

Dec. 8, 2008 (JP) ................................. 2008-312662

(51) Int. Cl.
| | |
|---|---|
| C23C 18/00 | (2006.01) |
| C04B 41/87 | (2006.01) |
| C04B 41/00 | (2006.01) |
| C04B 41/50 | (2006.01) |

(52) U.S. Cl.
CPC ......... *C04B 41/87* (2013.01); *Y10T 428/12549* (2015.01); *C04B 41/009* (2013.01); *C04B 41/5057* (2013.01)

(58) Field of Classification Search
USPC ...................................................... 427/228
See application file for complete search history.

(56) References Cited

U.S. PATENT DOCUMENTS

| | | | | | |
|---|---|---|---|---|---|
| 3,912,827 | A | * | 10/1975 | Komatsu et al. | ............... 427/399 |
| 4,256,496 | A | * | 3/1981 | Brandstatter | ................... 501/87 |
| 5,322,824 | A | * | 6/1994 | Chia | ................................ 501/89 |

(Continued)

FOREIGN PATENT DOCUMENTS

| | | |
|---|---|---|
| JP | 60-192698 A | 10/1985 |
| JP | 8-59373 A | 3/1996 |

(Continued)

OTHER PUBLICATIONS

JP 08-143384 Machine Translation, 1996.*

(Continued)

*Primary Examiner* — Robert Vetere
(74) *Attorney, Agent, or Firm* — Westerman, Hattori, Daniels & Adrian, LLP

(57) ABSTRACT

A method of manufacturing a surface-modified carbon material is provided that can form a layer of a metal or the like on the surface in a simple manner and with adhesion performance. The surface-modified carbon material is also provided. The method is characterized by heat-treating a carbon substrate together with a carbon member other than the carbon substrate, the carbon substrate embedded in a surface modifying agent comprising a pyrolytic hydrogen halide generating agent and metal particles containing a transition metal. More specifically, a carbon substrate (2) is embedded in powder (3) containing a pyrolytic hydrogen halide generating agent such as ammonium chloride and metal particles containing a transition metal such as stainless steel, and the carbon substrate (2) is heat-treated together with a carbon member other than the carbon substrate, such as a the graphite crucible (6).

13 Claims, 1 Drawing Sheet

(56) References Cited

U.S. PATENT DOCUMENTS

| | | | | |
|---|---|---|---|---|
| 5,855,955 | A | * | 1/1999 | Claar et al. ............... 427/248.1 |
| 5,942,204 | A | * | 8/1999 | Dunmead et al. ............ 423/440 |
| 2005/0054738 | A1 | * | 3/2005 | Fraenkel ..................... 518/716 |
| 2005/0153125 | A1 | * | 7/2005 | Shiokawa et al. ............ 428/336 |

FOREIGN PATENT DOCUMENTS

| | | | |
|---|---|---|---|
| JP | 08-143384 | A | 6/1996 |
| JP | 08-143385 | A | 6/1996 |
| JP | 08143384 | * | 6/1996 |
| JP | 3081765 | B2 | 8/2000 |

OTHER PUBLICATIONS

Cairo et al., "Functionally gradient ceramic coating for carbon-carbon oxidation protection," J. Euro. Ceram. Soc. 21, pp. 325-329, 2001.*

International Search Report of PCT/JP2009/070226, date of mailing Jan. 19, 2010.

Chinese Office Action dated Dec. 6, 2012, issued in corresponding Chinese Patent Application No. 200980145499.2, with English Translation (12 pages).

Japanese Office Action dated Apr. 17, 2013, issued in corresponding Japanese Patent Application No. 2008-312662, with English translation (6 pages).

Chinese Office Action dated Jul. 9, 2013, issued in corresponding Chinese Patent Application No. 200980145499.2 with English translation (15 pages).

Office Action dated Jun. 11, 2014, issued in corresponding Taiwanese Patent Application No. 098141726, with English Translation (10 pages).

Office Action dated Mar. 24, 2014, issued in Chinese Patent Application No. 200980145499.2 with English Translation (7 pages).

* cited by examiner

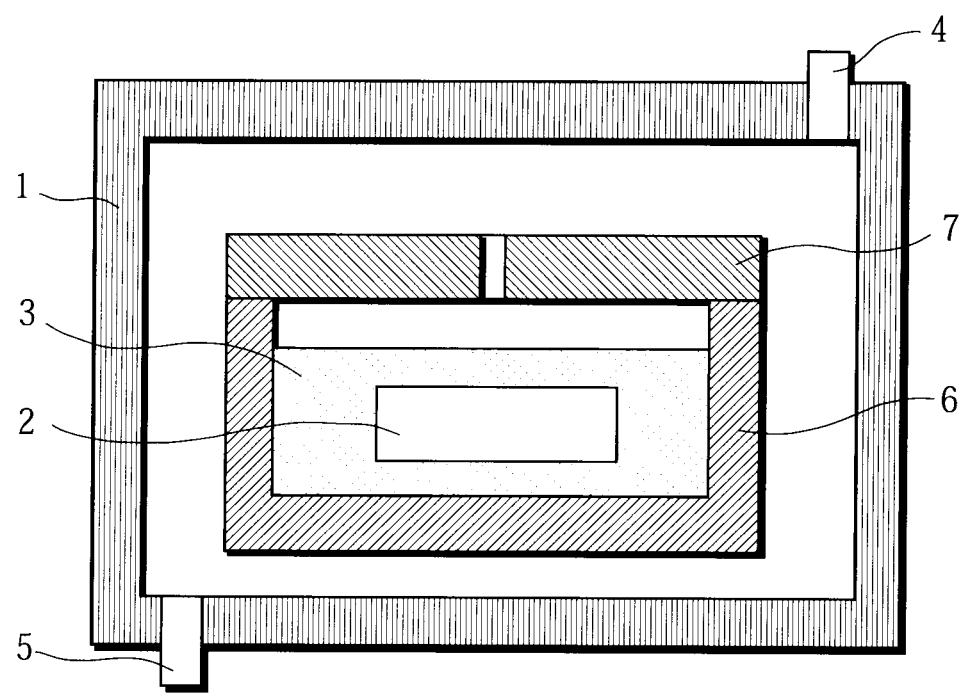

METHOD OF MANUFACTURING A CARBON MATERIAL AND THE CARBON MATERIAL

TECHNICAL FIELD

The present invention relates to a method of manufacturing a surface-modified carbon material, and to the surface-modified carbon material.

BACKGROUND ART

A carbon material is light in weight and excellent in chemical and thermal stability and has good thermal conductivity and electrical conductivity even though it is a non-metal material. A carbon material is light in weight and excellent in chemical and thermal stability and has good thermal conductivity and electrical conductivity even though it is a non-metal material. However, when a layer of a material other than carbon is formed on the carbon material, there is a problem in adhesion performance between the carbon material and the layer of the other material.

As a method for improving the adhesion performance, Patent Documents 1 and 2, for example, describes that, by treating a carbon substrate with halogenated chromium gas, a chromium carbide layer comprising $Cr_{23}C_6$ is formed on the surface, and the chromium carbide layer is coated with a metal by thermal spraying. However, this technique has the following problems. It takes a very long time to form a layer comprising $Cr_{23}C_6$ that can withstand the thermal spraying of a metal. Also, the treatment is complicated and troublesome; for example, it is essential to carry out the treatment in a hydrogen gas atmosphere and the treatment needs to be performed under a reduced pressure.

CITATION LIST

Patent Literature

[Patent Document 1] Japanese Unexamined Patent Publication No. 8-143384
[Patent Document 2] Japanese Unexamined Patent Publication No. 8-143385

SUMMARY OF THE INVENTION

Problems to be Solved by the Invention

The present invention has been accomplished in view of the foregoing problems, and it is an object of the present invention to provide a method of manufacturing a surface-modified carbon material that can form a layer of a metal or the like on the surface with good adhesion performance in a simple manner, and to provide the surface-modified carbon material.

Means for Solving the Problems

The present invention provides a method of manufacturing a carbon material, characterized by heat-treating a carbon substrate together with a carbon member other than the carbon substrate, the carbon substrate embedded in a surface modifying agent containing a pyrolytic hydrogen halide generating agent and metal particles comprising a transition metal.

Examples of the carbon member include a container made of carbon, such as a graphite crucible, and carbon powder. The heat-treating may be performed under normal pressure. Moreover, the metal particles comprising a transition metal may be transition metal particles or alloy particles containing a transition metal, and it is particularly preferable to use an alloy containing Cr, such as stainless steel. The reason is that, by using the alloy containing Cr, a metal carbide containing Cr and a metal carbide layer can be formed by the heat treatment at one time.

The present invention also provides a carbon material characterized by having a metal carbide layer containing $M_2C$ or $M_3C_2$ (M: transition metal element) on a carbon substrate, and having a metal layer or an alloy layer on the metal carbide layer. It is preferable that the M be Cr. It is also preferable that the metal contained in the metal carbide layer be a transition metal, such as Cr, Fe, and Ni. It is preferable that the metal carbide layer have a thickness of 100 μm or less.

This carbon material can be manufactured desirably by the carbon material manufacturing method of the present invention. By using stainless steel powder as the metal powder containing a transition metal in the manufacturing method, a metal carbide layer containing $Cr_2C$ or $Cr_3C_2$ and containing Ni and Fe can be easily formed on the carbon substrate at one time.

Advantages of the Invention

The carbon material manufacturing method of the present invention makes it possible to shorten the treatment time and at the same time to eliminate the need of supplying a hydrogen gas by using a carbon member such as carbon powder and a container made of a carbon material. Thereby, the surface modification of the carbon substrate can be made more easily. This makes it possible to improve the adhesion performance of the carbon substrate with a layer of a metal or the like that is to be later formed on the surface, and also to improve the strength of the resulting carbon material over the carbon substrate.

Moreover, pressure reduction is not needed, and the heat-treating can be conducted under normal pressure (in an atmospheric pressure). Thus, the treatment can be conducted in a simple manner.

The carbon material according to the present invention shows good adhesion performance with a layer of metal or the like that is to be formed later, and also has improved strength.

BRIEF DESCRIPTION OF THE DRAWING

FIG. 1 is a view illustrating one example of a heating apparatus used for a method, according to the present invention, of manufacturing a carbon material.

BEST MODE FOR CARRYING OUT THE INVENTION

Hereinbelow, the present invention will be described in detail.

In the present invention, the method of manufacturing a carbon material includes heat-treating a carbon substrate together with a carbon member other than the carbon substrate, the carbon substrate embedded in a surface modifying agent (in a powdery state) comprising a pyrolytic hydrogen halide generating agent and metal particles containing a transition metal.

According to the present invention, the method of manufacturing a carbon material makes it possible to form a metal carbide layer on the surface of the carbon substrate in a simple and easy manner, and the method allows the carbon material to have good adhesion performance with a layer of a metal or the like that is later formed on the carbon material. Examples of the method of later forming a metal layer or the like on the carbon material include plating and thermal spraying, and an example of the method that achieves particularly good adhesion performance is plating.

In the carbon material manufacturing method of the present invention, the carbon substrate to be treated is heat-treated together with a carbon member other than the carbon substrate. Examples of the carbon member include a container made of carbon, such as a graphite crucible, and carbon powder. By heat-treating the carbon substrate to be treated together with the carbon member in this way, a metal carbide layer can be formed on the carbon substrate in a short time. The reason is believed to be that by using the carbon member, the materials contained in the powder, such as the transition metal and the pyrolytic hydrogen halide generating agent, can be utilized efficiently for the surface treatment of the carbon substrate, so the necessary heat amount can be reduced.

With a treatment time of less than 1 hour, the metal carbide layer can be formed without color unevenness and substantially uniformly on the carbon substrate. This metal carbide layer can be formed sufficiently even with a treatment time of as long as 30 minutes. The treatment time may be longer, for example, 1 hour or longer, if the metal carbide layer needs to be thicker.

It is preferable that the heat treatment be performed at from 800° C. to 1200° C. By performing the treatment within this temperature range, the carbon substrate can be treated efficiently. If the temperature is too low, it is possible that the formation of the metal carbide layer may be slow. If the temperature is too high, it is possible that the powder that has not reacted in the heat treatment may be thermally melted and bonded to the carbon substrate.

It is preferable that the heat-treating be performed under normal pressure. Since the treatment can be performed under normal pressure, the equipment such as a vacuum pump is unnecessary, and the time required for reducing the pressure is also unnecessary. As a result, the treatment becomes simpler, and the treatment time reduces. Although it is possible to perform the treatment under reduced pressure, it may become difficult to cause an efficient reaction of hydrogen halide since the pyrolytic hydrogen halide generating agent may undergo violent decomposition at low temperature, and also, it is possible that the powder may scatter.

The carbon material manufacturing method of the present invention does not require introduction of hydrogen gas. Therefore, safety is improved, and the treatment can be conducted easily. It is, however, possible to introduce an inert gas such as nitrogen gas, if necessary.

Hereinbelow, the components and members used in the present invention will be described.

Examples of the carbon substrate include, but not particularly limited to, isotropic graphite materials, anisotropic graphite materials, and carbon fiber materials. It is preferable that the carbon substrate have a bulk density of from 1.4 g/cm$^3$ to 2.1 g/cm$^3$, an average pore radius of 10 μm or less, and a porosity of 40% or less.

The pyrolytic hydrogen halide generating agent is such that is kept in a solid state under room temperature and normal pressure but is decomposed by heating to generate a hydrogen halide such as hydrogen chloride, hydrogen fluoride, and hydrogen bromide. It is preferable that the heat decomposition temperature of the pyrolytic hydrogen halide generating agent be 200° C. or higher, so that the handling before the heating can be easy. The hydrogen halide generated from the pyrolytic hydrogen halide generating agent reacts with the transition metal during the heat treatment and produces a metal halide gas. By treating the carbon substrate with the metal halide gas, the metal carbide layer can be formed on the surface of the carbon substrate. Since the treatment of the carbon substrate is conducted with gas as described above, the metal carbide layer can be formed substantially uniformly on the carbon substrate even when the carbon substrate has a complicated shape with, for example, holes and grooves.

It is preferable that the pyrolytic hydrogen halide generating agent be ammonium chloride from the viewpoint of availability.

It is sufficient that a transition metal is contained in the metal particles containing a transition metal. Examples include a mixture powder of a transition metal and another metal, and an alloy powder of a transition metal and another metal. Examples of the transition metal include Ti, V, Cr, Mn, Fe, Co, Ni, Cu, Zn, Zr, Nb, Mo, and Ta, but the transition metal is not particularly limited as long as it reacts with the hydrogen halide and produces a metal halide gas. The produced metal halide gas reacts with the carbon in the surface of the carbon substrate and produces a metal carbide. It is preferable that Cr be contained in the transition metals from the viewpoint of its high reactivity. It is preferable that the metal particles be an alloy powder containing Cr, and an example is stainless steel.

Especially when using metal particles comprising stainless steel, which is an alloy containing Cr, Ni, and Fe, a layer containing Ni, Fe, and chromium carbide is formed at one time of the heat treatment.

It is particularly preferable to use a powder containing stainless steel, which is an alloy containing Cr, Ni, and Fe, and ammonium chloride for the heat treatment, from the viewpoints of handling and cost.

Examples of the carbon member include a container made of carbon, such as a graphite crucible, and carbon powder.

With the use of the carbon member, the treatment time of the carbon substrate can be shortened, and the need of supplying a hydrogen gas can be eliminated. As a result, the surface modifying of the carbon substrate can be achieved in a simpler manner and more easily. This makes it possible to improve the adhesion performance of the carbon substrate with a layer of a metal or the like that is to be later formed on the surface, and also to improve the strength of the resulting carbon material over the carbon substrate. Moreover, pressure reduction is not needed, and the heat-treating can be conducted under normal pressure (in an atmospheric pressure). Thus, the treatment can be conducted in a simple manner.

It is preferable that the carbon member be a graphite crucible. The use of a graphite crucible in the treatment makes it possible to suppress the flow of the gas around the embedded carbon substrate, and to form the metal carbide layer without color unevenness and more uniformly on the surface of the carbon substrate. Moreover, the gas produced from the powder can be kept in the graphite crucible to a certain degree, so the produced gas can be utilized effectively. It is preferable that a lid be placed on the graphite crucible, and the lid serves to further suppress the flow of the gas around the carbon substrate. Examples of the lid include one made of graphite, and a sheet made of graphite. In order to release the gas produced in the container, it is preferable that an air hole be provided in the container or in the lid. When using a sheet made of graphite, the air hole is not particularly necessary since the sheet merely covers the container.

When using carbon powder as the carbon member, it is recommended that the metal particles containing a transition metal, the pyrolytic hydrogen halide generating agent, and the carbon powder be filled in the container, the carbon substrate be embedded in the powder filled in the container, and the carbon substrate be heat-treated. When using carbon powder as the carbon member, the container is not particularly limited. In the treatment, it is possible to suppress the flow of the gas in the container by, for example, putting a lid or a sheet made of graphite on the container. It is also possible to use the above-mentioned graphite crucible as the container.

As described above, an introduced gas is not directly blown into the container in which the carbon substrate is embedded. Conversely, if an attempt is made to carry out the treatment while introducing a hydrogen gas, it is difficult to perform the treatment using the hydrogen gas efficiently because the container, such as the graphite crucible, hinders introduction of the hydrogen gas.

Next, one example of the heating apparatus for carrying out the heat treatment in the carbon material manufacturing method of the present invention will be described with reference to FIG. 1. The following description is made about a case in which a graphite crucible is used as the carbon member.

As illustrated in FIG. 1, a heating apparatus used in the carbon material manufacturing method of the present invention (the present heating apparatus) has a heating furnace 1 having a heater for heat-treating a treatment material placed in the heating furnace 1. The heating furnace 1 is provided with a gas inlet port 4 and a gas exhaust port 5. An inert gas such as nitrogen gas and argon gas can be introduced from the gas inlet port 5, as necessary.

In the present heating apparatus, a graphite crucible 6 is disposed in the heating furnace 1. The graphite crucible 6 is configured so that powder 3 (surface modifying agent) can be filled in the graphite crucible 6, a carbon substrate 2 to be treated can be embedded in the powder 3, and further, a lid 7 can be placed on the graphite crucible 6. The lid 7 has an air hole. The powder 3 contains a pyrolytic hydrogen halide generating agent and metal powder (metal particles) containing a transition metal. It is possible to add alumina powder, which is not involved in the reaction, to the powder 3.

With the heating apparatus of FIG. 1, the powder 3 is filled in the graphite crucible 6 as the carbon member, the carbon substrate 2 is embedded in the powder 3 filled in the crucible, and the lid is put thereon. Then, the graphite crucible 6 is placed in the heating apparatus and heated. With the above-described configuration, the carbon material manufacturing method of the present invention can be implemented.

A carbon material of the present invention has a metal carbide layer containing a metal and $M_2C$ or $M_3C_2$ (M: a transition metal element) on a carbon substrate, and a metal layer on the metal carbide layer. It is preferable that the M be Cr. It is also preferable that the metal contained in the metal carbide layer be a transition metal, such as Cr, Fe, and Ni, or an alloy thereof. It is preferable that the maximum thickness of the metal carbide layer be 100 μm or less. On the other hand, when the minimum thickness of the metal carbide layer exceeds 0 μm, the advantageous effects of the present invention can be exhibited. Nevertheless, in order to obtain the advantageous effects more sufficiently, it is desirable that the minimum thickness be 0.5 μm or greater.

This configuration makes it easy to join the carbon material of the present invention with a metal member with the use of a joining material made of a metallic material. Accordingly, the joining strength can be improved. Providing a metal layer on the metal carbide layer in this way makes it possible to join the carbon material with a metal member. Thereby, it becomes possible to impart the characteristic of a carbon material to a metal material, which cannot be achieved by the metal alone.

The carbon material according to the present invention can be manufactured by performing the treatment using transition metals showing different reactivity from one another in the carbon material manufacturing method of the present invention. It is preferable that the transition metals contain Cr because the high reactivity of Cr with carbon can be utilized and the carbon material having a metal carbide layer containing $Cr_2C$ can be manufactured easily. Moreover, the carbon material having a metal carbide layer containing $Cr_2C$, Fe, and Ni is especially preferable, because it can be produced at one time of the treatment by using powder of, for example, stainless steel containing Cr, Fe, and Ni, and a plating layer of Ni or the like can be easily formed later.

Furthermore, since a plating layer can be formed firmly thereon, the carbon material can be easily bonded by an adhesive agent to a metal plate such as an aluminum plate, which can be used as a heat radiation plate.

EXAMPLES

Hereinbelow, the present invention will be described in further detail based on examples thereof. However, the present invention is not limited thereto.

Examples 1 to 5

Using an apparatus shown in FIG. 1, a mixture powder of stainless steel powder (SUS 314 powder), ammonium chloride ($NH_4Cl$), and alumina powder ($Al_2O_3$) was filled in a graphite crucible (made by Toyo Tanso Co., Ltd, Model number IG-11), and a carbon substrate (high-density isotropic graphite subjected to cold isotropic pressure forming: bulk density 1.8, average pore radius 5 μm, porosity 20%) having dimensions of 10 mm wide×60 mm long×10 mm thick was embedded in the mixture powder filled in the crucible. The crucible was placed in the heating furnace with a lid put thereon, and a heat treatment was performed. When heating, nitrogen was introduced from the gas inlet port, and the gas was discharged naturally from the gas exhaust port.

Comparative Examples 1 and 2

The carbon substrate was heat-treated in the same manner as described in Example 1, except that the graphite crucible was not used and in place of the graphite crucible, a porcelain crucible was used as the container.

The treatment conditions for the examples and the comparative examples were as set forth in Table 1 below.

TABLE 1

|  | Type of crucible | Treatment temperature (°C.) | Treatment time (min.) | Pressure inside furnace (Torr) | Powder (wt %) | | |
|---|---|---|---|---|---|---|---|
|  |  |  |  |  | SUS powder | $NH_4Cl$ | $Al_2O_3$ |
| Ex. 1 | Graphite | 800 | 30 | 760 | 81.2 | 18.3 | 0.5 |
| Ex. 2 | crucible | 1000 | 30 |  |  |  |  |

TABLE 1-continued

| | | Treatment | | Pressure inside | Powder (wt %) | | |
|---|---|---|---|---|---|---|---|
| | Type of crucible | temperature (°C.) | Treatment time (min.) | furnace (Torr) | SUS powder | NH₄Cl | Al₂O₃ |
| Ex. 3 | | 1200 | 30 | | | | |
| Ex. 4 | | 1000 | 60 | | | | |
| Ex. 5 | | 1000 | 180 | | | | |
| Comp. Ex. 1 | Porcelain crucible | 800 | 30 | | | | |
| Comp. Ex. 2 | | 800 | 120 | | | | |

The carbon materials heat-treated and produced according to these examples and comparative examples were evaluated for the following elements. The results of the evaluations are shown in Table 2.

(1) The condition of the layer formed on the carbon substrate (Condition)

The produced carbon materials were evaluated by visual observation and cross-sectional SEM image observation.

(2) Identification of the layer formed on the carbon substrate (Metal carbide layer)

For each of the produced carbon materials, the layer formed thereon was identified by analyzing the metals in vacuum using an EPMA analyzer EMAX-7000 made by Horiba Ltd.

(3) Thickness of the layer formed on the carbon substrate (Thickness)

The produced carbon materials were evaluated by visual observation and cross-sectional SEM image observation.

(4) Adhesion strength between the produced carbon material and the metal layer formed on the carbon material (Adhesion strength)

For each of the produced carbon materials, a 2-μm Ni-plating layer was formed thereon by electroless plating, and the adhesion strength of the plating layer was determined according to JIS H 8666.

TABLE 2

| | Condition | Metal carbide layer | Thickness (μm) | Adhesion strength (Kgf/cm²) |
|---|---|---|---|---|
| Ex. 1 | The layer was formed substantially uniformly over the entire surface of the carbon substrate. | Cr₂C Fe—Ni alloy | 1 | 150 |
| Ex. 2 | The layer was formed substantially uniformly over the entire surface of the carbon substrate. | Cr₂C Fe—Ni alloy | 6 | 150 |
| Ex. 3 | The layer was formed substantially uniformly over the entire surface of the carbon substrate. | Cr₂C Fe—Ni alloy | 8 | 150 |
| Ex. 4 | The layer was formed substantially uniformly over the entire surface of the carbon substrate. | Cr₂C Fe—Ni alloy | 6 | —*1 |
| Ex. 5 | The layer was formed substantially uniformly over the entire surface of the carbon substrate. | Cr₂C Fe—Ni alloy | 8 | —*1 |
| Comp. Ex. 1 | The layer could not be formed over the entire surface of the carbon substrate, and color unevenness occurred. | Cr₂C Fe—Ni alloy | 1 | —*2 |

*1 Adhesion strength was not measured for Examples 4 and 5.
*2 Adhesion strength was impossible to measure for Comparative Examples 1 and 2 because no layer was formed thereon.

As seen from the above results, when no carbon member was used, the metal carbide layer could not be formed over the entire surface of the carbon substrate, and color unevenness occurred, so the metal carbide layer could not be formed uniformly on the carbon substrate. In addition, it is demonstrated that the carbon materials manufactured according to the carbon material manufacturing method of the present invention showed very high adhesion performance with the later-formed metal layer.

INDUSTRIAL APPLICABILITY

The carbon material manufacturing method according to the present invention makes it possible to modify the surface of the carbon substrate by a very simple treatment, merely by embedding a carbon substrate in powder and heating the substrate.

DESCRIPTION OF REFERENCE NUMERALS

1 heating furnace
2 carbon substrate
3 powder
4 gas inlet port
5 gas exhaust port
6 graphite crucible
7 lid

The invention claimed is:

1. A method of manufacturing a carbon material, characterized by heat-treating a carbon substrate together with a carbon member other than the carbon substrate in an inert gas atmosphere without introducing a hydrogen gas which comprises only hydrogen, the carbon substrate placed in a surface modifying agent comprising a pyrolytic hydrogen halide generating agent and metal particles containing a transition metal, wherein
the metal particles are particles of an alloy containing Cr; and a metal carbide layer containing a metal and Cr₂C or Cr₃C₂ is formed on a surface of the carbon substrate.

2. The method of manufacturing a carbon material according to claim 1, characterized in that: the carbon member comprises a container made of carbon; and the heat-treating is performed with a lid made of graphite or a sheet made of graphite placed on the container after placing the carbon substrate, placed in the surface modifying agent, in the container.

3. The method of manufacturing a carbon material according to claim 2, characterized in that; the carbon member comprises carbon powder; and the carbon substrate, placed in the surface modifying agent containing the carbon powder, the metal particles containing a transition metal, and the pyrolytic hydrogen halide generating agent, is heat-treated.

4. The method of manufacturing a carbon material according to claim 3, characterized in that the heat-treating is performed under normal pressure.

5. The method of manufacturing a carbon material according to claim 3, characterized in that the pyrolytic hydrogen halide generating agent is ammonium chloride.

6. The method of manufacturing a carbon material according to claim 2, characterized in that the heat-treating is performed under normal pressure.

7. The method of manufacturing a carbon material according to claim 2, characterized in that the pyrolytic hydrogen halide generating agent is ammonium chloride.

8. The method of manufacturing a carbon material according to claim 1, characterized in that; the carbon member comprises carbon powder; and the carbon substrate, placed in the surface modifying agent containing the carbon powder, the metal particles containing a transition metal, and the pyrolytic hydrogen halide generating agent, is heat-treated.

9. The method of manufacturing a carbon material according to claim 8, characterized in that the heat-treating is performed under normal pressure.

10. The method of manufacturing a carbon material according to claim 8, characterized in that the pyrolytic hydrogen halide generating agent is ammonium chloride.

11. The method of manufacturing a carbon material according to claim 1, characterized in that the heat-treating is performed under normal pressure.

12. The method of manufacturing a carbon material according to claim 1, characterized in that the pyrolytic hydrogen halide generating agent is ammonium chloride.

13. A method of manufacturing a carbon material characterized by heat-treating a carbon substrate together with a carbon member other than the carbon substrate, the carbon substrate placed in a surface modifying agent comprising a pyrolytic hydrogen halide generating agent and metal particles containing a transition metal, wherein the carbon substrate has an average pore radius of 5-10 μm, wherein the metal particles are particles of an alloy containing Cr; and a metal carbide layer containing a metal and $Cr_2C$ or $Cr_3C_2$ is formed on a surface of the carbon substrate.

\* \* \* \* \*